Aug. 24, 1954  B. E. O'CONNOR  2,687,047
INERTIA MASS DEVICE FOR CONTROLLING ROTARY MOTION
Filed Feb. 14, 1949
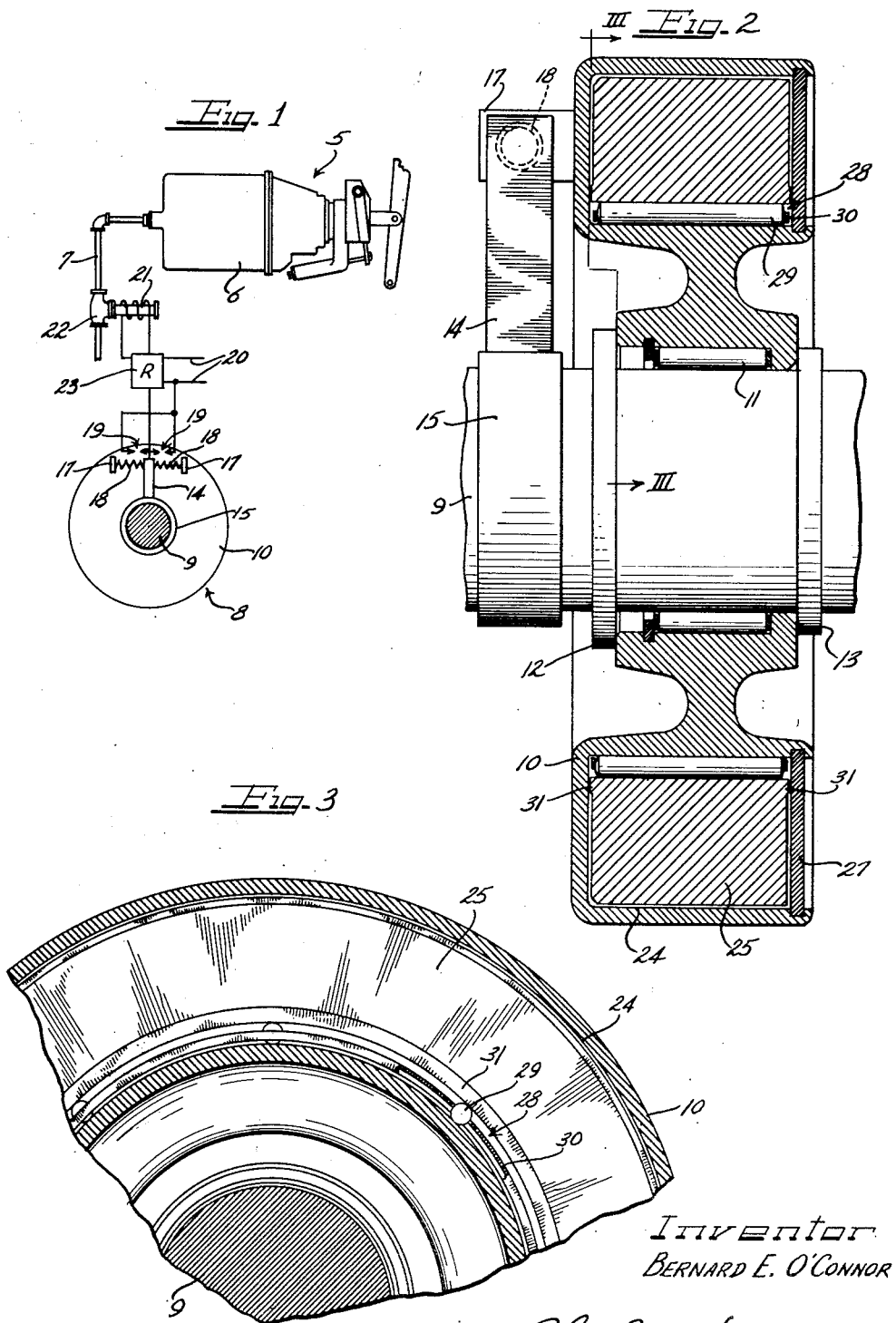
Inventor
BERNARD E. O'CONNOR
by The Firm of Charles W. Hills Attys.

Patented Aug. 24, 1954

2,687,047

UNITED STATES PATENT OFFICE 2,687,047

INERTIA MASS DEVICE FOR CONTROLLING ROTARY MOTION

Bernard E. O'Connor, Buffalo, N. Y., assignor to Houdaille-Hershey Corporation, Detroit, Mich., a corporation of Michigan Application February 14, 1949, Serial No. 76,375

4 Claims. (Cl. 74—574)

The present invention relates to improvements in devices for guarding against excessive deceleration in mechanism or apparatus subject to braking control, and is more particularly concerned with devices of the kind sometimes referred to as "acceleration-sensitive controls" which may be used in connection with the wheels of a vehicle such as a railroad car.

Although it will be apparent as the description proceeds that the present invention is applicable to a variety of different practical applications, its use in guarding against excessive wheel deceleration in railroad cars has been selected as one specific example of its usefulness.

In a rail car over-rapid deceleration results in wheel slide, causing substantial lowering in adhesion between the wheels and the rails while at the same time tending to wear spots in the wheels and produce thermal cracks. Hence, the ideal condition to be attained is to effect deceleration at the highest possible braking level while avoiding wheel slide.

An important object of the present invention is to provide an improved device for use in apparatus for so controlling deceleration as to obtain the highest braking level without any of the detrimental effects resulting from sliding deceleration.

Another object of the invention is to provide an improved viscous fluid coupled rotatably and axially movably housed inertia mass device, such as may utilize silicone fluid as the viscous medium in shear film coupling, wherein the major portions of the axially facing opposed surfaces of the inertia mass and of the chamber in the housing are maintained out of rubbing contact under operating conditions wherein there is a tendency toward substantial axial movement of the inertia mass in the housing.

Other objects, features and advantages of the present invention will be readily apparent from the following detailed description of a preferred embodiment thereof taken in conjunction with the accompanying drawing in which:

Figure 1 is a schematic illustration of a braking mechanism and a deceleration control unit for controlling operation of the braking mechanism according to the present invention;

Figure 2 is a diametrical sectional view through a deceleration controlling unit embodying the features of the present invention; and Figure 3 is a fragmentary detail sectional view taken substantially on the line III—III of Figure 2.

In, for example, a railway car, a fluid brake mechanism 5 such as an air brake and including a pressure cylinder 6 to which pressure fluid is delivered from a suitable source (not shown) by way of a duct 7, is employed to apply the brakes (not shown) associated with the wheels (not shown) of the car. In the absence of any control, the braking mechanism will eventually in a brake setting operation lock the wheels and cause the same to slide.

According to the present invention, locking of the wheels is prevented by so controlling the operation of the braking mechanism 5 that excessive deceleration of the wheels is prevented. To this end a device 8 for guarding against such excessive wheel deceleration is mounted in association with an axle 9 rigid with the wheels controlled by the braking mechanism 5. The device 8 comprises a flywheel unit 10 carried by the axle 9 in such a manner that during normal acceleration and deceleration of the axle 9 as it turns with the wheels, the flywheel unit travels rotatively with the axle, but in the event of excessive wheel deceleration the flywheel unit will tend to move relative to the axle and thereby set into operation means whereby operation of the braking mechanism is controlled to reduce its braking action before the wheels become locked.

In order to couple the flywheel unit 10 for joint rotation with the shaft 9, while nevertheless providing for a range of relative movement of the flywheel unit and the axle, the flywheel unit is mounted relatively rotatably upon the axle 9 and to minimize friction is provided with an anti-friction bearing assembly 11 being held against axial displacement by means such as respective retainers 12 and 13 at opposite sides of the flywheel hub and carried by the axle. Means for effecting joint rotation of the flywheel 10 with the axle 9 comprises an arm 14 secured fixedly to the axle shaft 9 as by means of a connecting collar 15 and disposed closely adjacent to one side of the flywheel unit. The outer extremity of the radially projecting coupling arm 14 extends between a spaced pair of abutments 17 rigid with the adjacent side of the flywheel unit near the periphery of the latter and projecting to an adequate distance from the side of the flywheel unit to cooperate with the coupling arm. Interposed between the coupling arm 14 and the abutments 17 are respective resilient coupling members such as springs 18. These springs are preloaded to provide a resilient or spring drive which will cause joint rotation of the flywheel unit 10 with the axle 9 in either rotary direction under normal operating conditions.

However, the loading of the coupling or drive springs 18 is such that they will yield in response to tendency of the flywheel unit 10 to overrun the wheels and thereby the axle 9 in the event of rapid deceleration. The spring drive precompression or loading is such that at the instant of excessive wheel deceleration which occurs at the beginning of a wheel slip such deflection of the flywheel unit 10 will occur due to its tendency to overrun the decelerating axle 9 by reason of flywheel inertia, that an appropriate electrical control switch 19 is closed to close an electrical circuit 20 and cause a solenoid operator 21 to operate a control valve 22 in the fluid duct 7 for reducing the brake cylinder pressure enough to allow the wheels to resume normal rotation. Closing of the switch 19 in either direction, depending on the direction of travel of the car, acts as a starter for an auxiliary electrical circuit including a time delay relay 23 which functions to energize the solenoid 21 for a definite brief period of time and then breaks the solenoid circuit and allows the brake cylinder pressure to be restored.

At the moment brake pressure is reduced by operation of the deceleration control unit 8 the affected coupling spring 18 is, of course, in maximum deflected condition. In the absence of any restraining influence upon the flywheel mass it would tend to vibrate indefinitely at the amplitude of such maximum deflection, and brake pressure would not be reapplied or at least reapplication thereof unduly prolonged. According to the present invention, however, such vibration is prevented by equipping the flywheel unit 10 with auxiliary mass and viscous damping means. To this end, the principal flywheel component of the flywheel unit 10 has a chamber 24 within which is housed an auxiliary flywheel mass in the form of a ring 25 and which is adapted for rotary movement relative to the enclosing housing.

In one practical form, the auxiliary inertia mass chamber 24 is provided by integral walls which may be formed in one piece with the principal flywheel unit component except at one side which is originally open but closed by a closure plate 27 permanently and hermetically secured in place. By preference the internal wall surfaces defining the chamber 24 are angularly related, and the auxiliary damping mass 25 is of substantially complementary cross-section but of predetermined slightly smaller dimensions so that in the ideal relationship uniform spaced relation is attained between the axially facing opposed surfaces of the auxiliary mass and the housing and the peripheral opposing surfaces. Within the space thus afforded within the chamber 24 a viscous damping fluid such as a selected silicone is contained and provides a viscous coupling medium normally acting to restrain relative rotary movements of the principal flywheel component and the auxiliary damping mass 25. For this purpose, the spacings between the axially facing and peripheral opposed surfaces of the housing and auxiliary mass are predetermined to limit the viscous fluid to thin shear film which is greater than a mere lubricating film but is less than will result in a mere drag relationship between the viscous fluid and the opposing surfaces. Such drag relationship is also expressible as a non-linear velocity gradient in the fluid between the opposing working surfaces. The spacing which is present between the working surfaces of the auxiliary flywheel mass 25 and the enclosing housing is sufficiently close to result in a linear velocity gradient in the fluid and which may more simply be described as a shear film since relative movement between the inertia masses must result in a substantially shearing action of the viscous fluid films between the working surfaces and thus attains a highly efficient viscous fluid coupling strongly though yieldably resisting relative rotation of the masses.

Concentricity is maintained and hub friction is minimized by the provision of a roller bearing assembly 28 between the inner surface of the auxiliary flywheel mass 25 and the opposing hub surface of the principal flywheel component. In a simple and efficient form the bearing assembly 28 comprises a uniform series of fairly widely spaced rollers 29 maintained in the operative spaced relation by means of a simple annular sheet metal cage 30. As a result the auxiliary mass 25 is supported concentrically in the flywheel assembly and with only virtually insignificant rolling friction to overcome for relative rotary movement within the chamber 24 so that maximum efficiency of the viscous fluid coupling shear films is attained even though the rotary speeds involved in operation are relatively small.

In view of the fact that the relatively low operating speeds may not produce sufficient centrifugal pressure within the chamber 24 to create axial equalizing force in the shear film spacings between the axially facing working surfaces of the unit, very limited areas of the axially facing surfaces of the auxiliary flywheel mass 25 may be offset from minor portions of the principal mass of such surfaces to serve as centering guides and axial movement limiting stops. To this end, the radially inner margins of the axially facing surfaces may be provided with annular spacer pad respective offsets 31. The spacer pads 31 more closely approach the opposing housing surfaces, that is, they are normally in spaced relation to the opposing housing chamber surfaces less than the shear film spaced relation, but afford free and substantially frictionless limit upon any substantial axial displacement of the auxiliary flywheel ring mass 25. Thereby it will be clear that the major portions of the axially facing surfaces of the inertia mass will be maintained out of rubbing contact with the opposing chamber surfaces.

In operation, the flywheel unit 10 is compelled to rotate with the shaft or axle 9 by the resilient coupling afforded by the coupling arm 14 and the springs 18. In such rotation the auxiliary flywheel mass 25 is caused to rotate with the principal, enclosing flywheel component by reason of the viscous fluid shear film coupling between the flywheel components. Upon deceleration in response to operation of the braking mechanism 5 the inertia of the flywheel unit tends to cause it to overrun the shaft or axle and thus effect a deflection of the yieldable resilient coupling. Upon excessive deceleration such as will result in locking and slipping of the wheels, flywheel inertia effects further deflection of the yieldable coupling until the brake pressure controlling electrical circuit is closed and brake pressure relieved to permit continuing rotation of the wheels.

Any transient vibrations in the flywheel unit which might tend to occur as a result of the resilience or springiness of the spring coupling are dampened by the vibration damper afforded by the auxiliary inertia mass 25 and the viscous fluid coupling since the auxiliary inertia mass 25 tends to continue rotation in the direction of the wheels and thus effectually resists relative reverse rotation of the principal flywheel and housing component of the flywheel unit.

It is thus apparent that the inertia mass components of the flywheel unit 10 cooperate jointly for mutual brake control in excess decelerations but that the auxiliary inertia mass acts as a damper to restrain any tendency toward relative rotary movements of the inertia mass components. As a result, high operating efficiency is attained with only inconsequential frictional or heat losses, with virtually no wearing of relatively moving parts, at a constant predetermined functional rating and indefinitely free from servicing requirements.

It will be understood that modifications and variations may be effected without departing from the scope of the novel concepts of the present invention.

I claim as my invention:

1. In combination, a rotary member having a circular closed chamber therein provided with opposing axially facing surfaces, a damping fluid in said chamber, a circular inertia mass freely axially movable and rotatably housed within said chamber between said surfaces, axially facing surfaces on said inertia mass disposed, when the mass is centered between said chamber surfaces, in shear film spaced relation to said opposing surfaces within the chamber, and spacer pads of narrow radial extent offset from a minor portion of the axially facing surfaces of said inertia mass, but normally in spaced relation to the opposing chamber surfaces less than said shear film spaced relation so as to permit slight free axial movement of the inertia mass within the chamber, said spacer pads being operative as stops engageable with the opposing chamber surfaces during axial movements of the rotary member to maintain the major portions of the axially facing surfaces of the inertia mass out of rubbing contact with the opposing chamber surfaces.

2. A combination as defined in claim 1, wherein said inertia mass is an annulus, and said spacer pads are located adjacent to the inner periphery of the annulus.

3. A combination as defined in claim 1, wherein said spacer pads are annular in form and disposed about the axis of the inertia mass.

4. A combination as defined in claim 1, wherein said spacer pads are formed integrally in one solid piece with the inertia mass.

References Cited in the file of this patent

UNITED STATES PATENTS

| Number | Name | Date |
|---|---|---|
| 691,667 | Rowland | Jan. 21, 1902 |
| 1,969,755 | Kellogg | Aug. 14, 1934 |
| 2,013,109 | Reynolds | Sept. 3, 1935 |
| 2,019,147 | Loomis et al. | Oct. 29, 1935 |
| 2,363,611 | Newell | Nov. 28, 1944 |
| 2,365,180 | Eksergian | Dec. 19, 1944 |
| 2,393,031 | Eksergian | Jan. 15, 1946 |
| 2,454,980 | Sobell | Nov. 30, 1948 |
| 2,514,136 | O'Connor | July 4, 1950 |
| 2,514,139 | O'Connor | July 4, 1950 |

FOREIGN PATENTS

| Number | Country | Date |
|---|---|---|
| 670,184 | Germany | Jan. 13, 1939 |